United States Patent [19]

Wang et al.

[11] Patent Number: 4,684,701

[45] Date of Patent: Aug. 4, 1987

[54] METHOD FOR PREPARING ADVANCED EPOXY OR PHENOXY RESINS WITH LOW ALIPHATIC HALIDE CONTENT

[75] Inventors: Chun S. Wang, Lake Jackson; Robert L. Bowden, Angleton; Wuu N. Chen, Lake Jackson, all of Tex.

[73] Assignee: The Dow Chemical Company, Midland, Mich.

[21] Appl. No.: 911,197

[22] Filed: Sep. 24, 1986

Related U.S. Application Data

[63] Continuation-in-part of Ser. No. 829,362, Feb. 14, 1986, abandoned.

[51] Int. Cl.$^4$ ............................................. C08G 59/14
[52] U.S. Cl. .................................... 525/507; 528/88; 528/95; 528/104; 528/110
[58] Field of Search ................... 525/507; 528/88, 95, 528/104, 110, 102

[56] References Cited

U.S. PATENT DOCUMENTS

| | | | |
|---|---|---|---|
| 2,731,444 | 1/1956 | Greenlee | 528/110 |
| 2,990,396 | 6/1961 | Clark et al. | 528/95 |
| 3,477,990 | 11/1969 | Dante et al. | 260/47 |
| 3,547,881 | 12/1970 | Mueller et al. | 260/47 |
| 3,842,037 | 10/1974 | Sinnema | 528/95 |
| 3,948,855 | 4/1976 | Perry | 260/47 EP |
| 4,366,295 | 12/1982 | Tyler et al. | 525/482 |
| 4,447,598 | 5/1984 | Caskey et al. | 528/489 |
| 4,499,255 | 2/1985 | Wang et al. | 528/95 |
| 4,544,731 | 10/1985 | Cavitt et al. | 528/102 |
| 4,558,116 | 12/1985 | Wernti et al. | 528/95 |

FOREIGN PATENT DOCUMENTS 858648 12/1970 Canada .
893191 2/1972 Canada .

*Primary Examiner*—Earl Nielsen
*Attorney, Agent, or Firm*—James G. Carter

[57] ABSTRACT

Advanced epoxy resins having a low total aliphatic halide content are prepared by reacting an epoxy resin having an average of more than one 1,2-epoxide group per molecule with a material having an average of more than one phenolic hydroxyl group per molecule in the presence of a solvent having at least one aliphatic hydroxide group per molecule and a catalytic quantity of an alkali metal hydroxide. These low aliphatic halide-containing advanced epoxy resins are useful in formulations for preparing laminates, moldings, pottings and coatings for the electronics industry.

9 Claims, No Drawings

METHOD FOR PREPARING ADVANCED EPOXY OR PHENOXY RESINS WITH LOW ALIPHATIC HALIDE CONTENT

CROSS REFERENCE TO THE RELATED APPLICATION

This application is a continuation-in-part of application Ser. No. 829,362 file Feb. 14, 1986, now abandoned.

BACKGROUND OF THE INVENTION

The present invention concerns a method for preparing advanced epoxy resins which are low in aliphatic halide content.

Advanced epoxy resins have been found to be particularly useful in the preparation of electrical and structural laminates, potting formulations, molding formulations and the like. These advanced epoxy resins are usually prepared by reacting an epoxy resin and a polyhydric phenol in the presence of suitable advancement catalysts such as a phosphonium compound. While the resultant advanced epoxy resin has very good mechanical properties, when cured, they are deficient in electrical applications because they usually have a high aliphatic halide content. The present invention provides a method for preparing advanced epoxy or phenoxy resins having a low total aliphatic halide content.

SUMMARY OF THE INVENTION

The present invention pertains to a process for preparing advanced epoxy resins having a low aliphatic halide content which process comprises subjecting a mixture consisting essentially of (1) a material containing an average of more than one 1,2-epoxy group per molecule and which contains alphatic halide moieties;

(2) a material containing an average of more than one aromatic hydroxyl group per molecule;

(3) at least one inert liquid diluent or solvent for components (1) and (2) which do not contain an aliphatic hydroxyl-containing material;

(4) at least one material containing at least one aliphatic hydroxyl group per molecule which is free of epoxide groups; and (5) at least one alkali metal hydroxide to conditions suitable for reacting the aromatic hydroxyl groups of component (2) with the epoxy groups of component (1) and wherein (i) component (4) is present in an amount of from about 0.1 to about 5, preferably from about 0.2 to about 1 percent by weight of the amount of component (1);

(ii) component (5) is present in an amount of from about 0.25 to about 10, preferably from about 1 to about 3 moles per equivalent of total aliphatic halide contained in component (1); and (iii) components (1) and (2) are employed in an amount which provides a phenolic hydroxyl group to epoxy group ratio of from about 0.01:1 to about 2:1, preferably from about 0.01:1 to about 1:1, most preferably from about 0.1:1 to about 0.7:1;

thereby producing an advanced product having a total aliphatic halide content lower than that contained in component (1).

The term total aliphatic halide includes hydrolyzable halide and bound halide.

DETAILED DESCRIPTION OF THE INVENTION

The process of the present invention can be carried out at any temperature at which an epoxy group will react with an aromatic hydroxyl group up to the decomposition temperature of any of the reactants or reaction products. Particularly suitable temperatures are from about 60° C. to about 150° C., preferably from about 80° C. to about 120° C.

The epoxy-containing material and the aromatic hydroxyl-containing material can be employed in any quantity which will result in the desired material. When the epoxy-containing material is in excess, a product having terminal epoxy groups will be predominant product produced. When the aromatic hydroxyl-containing material is in excess, a product having terminal aromatic hydroxyl groups will be the predominant product produced. The epoxy-containing material and the aromatic hydroxyl-containing materials are usually employed in amounts which provide an aromatic hydroxyl group to epoxy group ratio of from about 0.01:1 to about 2:1, preferably from about 0.01:1 to about 1:1, most preferably from about 0.1:1 to about 0.7:1.

Suitable solvents or diluents which can be employed in the present invention include, for example, aromatic hydrocarbons, ketones, glycol ethers, aliphatic ethers, cycloaliphatic ethers, combinations thereof and the like.

Suitable aromatic hydrocarbons include, for example, toluene, xylene, benzene, trimethylbenzene, halogen substituted benzene or toluene, combinations thereof and the like.

Suitable ketones include, for example, acetone, methyl ethyl ketone, methyl isobutyl ketone, methyl amyl ketone, diethyl ketone, dipropyl ketone, combinations thereof and the like.

Suitable glycol ethers include, for example, propylene glycol methyl ether, diproplene glycol methyl ether, ethylene glycol methyl ether, diethylene glycol methyl ether, combinations thereof and the like.

Suitable aliphatic ethers include, for example, diethyl ether, dipropyl ether, ethyl propyl ether, dibutyl ether, combinations thereof and the like.

Suitable cycloaliphatic ethers include, for example, dioxane, tetrahydrofuran, combinations thereof and the like.

Suitable alkali metal hydroxides which can be employed herein include, for example, sodium hydroxide, potassium hydroxide, lithium hydroxide, combinations thereof and the like.

Suitable materials containing at least one aliphatic hydroxyl group per molecule which can be employed herein and which do not contain any epoxy groups include, for example, polyglycols containing at least one oxyalkylene group and having an average molecular weight of from about 100 to about 1000, glycols, monoethers of glycols, acyclic and cyclic aliphatic alcohols and the like. Particularly suitable materials containing at least one aliphatic hydroxyl group per molecule include, for example, polyethylene glycols, polypropylene glycols, polybutylene glycols, ethylene glycol, propylene glycol, butylene glycol, n-butanol, t-butanol, cyclohexanol, pentanol-1, hexanol-1, hexanol-2, hexanol-3, heptanol-1, heptanol-2, heptanol-3, heptanol-4, ethylene glycol methyl ether, ethylene glycol ethyl ether, propylene glycol methyl ether, propylene glycol ethyl ether, mixtures thereof and the like.

Suitable epoxy resins which can be advanced by the process of the present invention include any aromatic or aliphatic including cycloaliphatic based material having an average of more than one 1,2-epoxy group per molecule. Particularly suitable epoxy-containing material include, for example, those represented by the following formulas I-V:

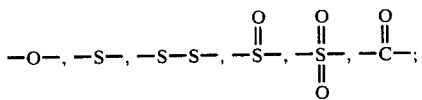

each A' is independently a divalent hydrocarbyl group

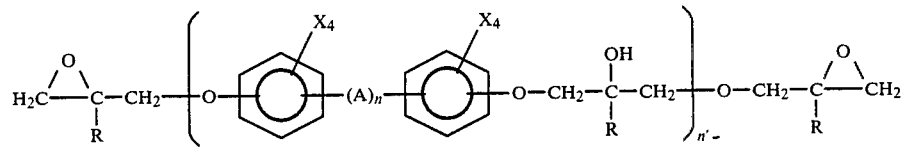
I.

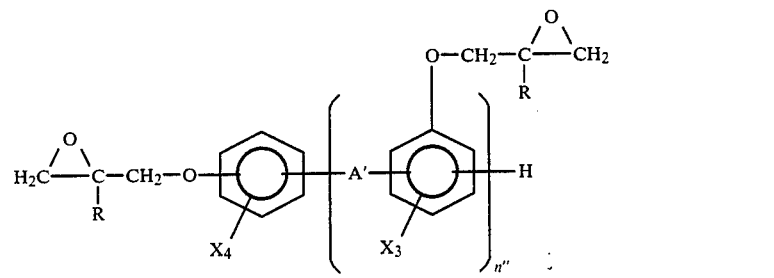
II.

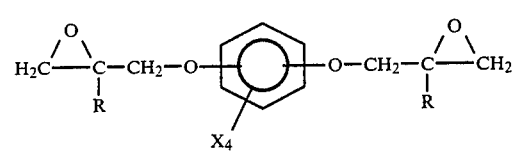
III.

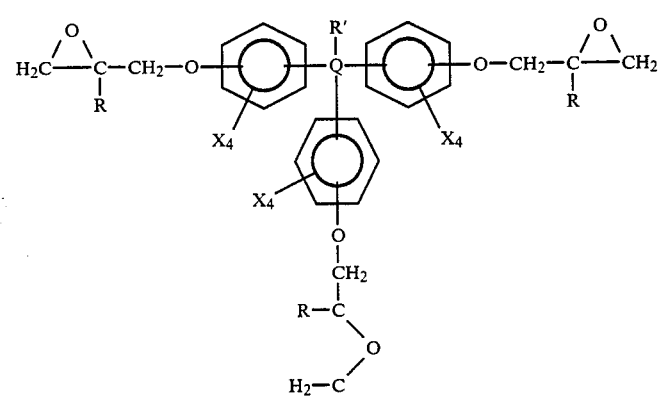
IV.

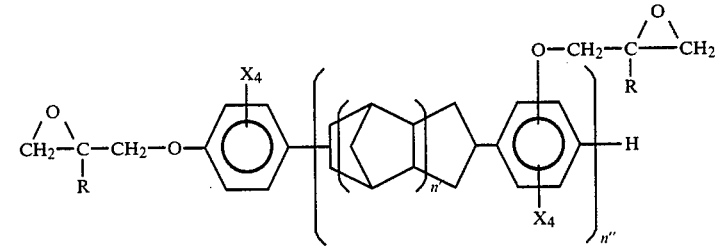
V.

wherein each A is independently a divalent hydrocarbyl group having from about 1 to about 12, preferably from about 1 to about 6, most preferably from about 1 to about 3, carbon atoms, having from 1 to about 12, preferably from about 1 to about 6, most preferably from about 1 to about 3 carbon atoms; Q is a trivalent hydrocarbyl group having from 1 to about 12, preferably from about 1 to about 6, most preferably from 1 to about 3, carbon atoms; each R is independently hydrogen or an alkyl group having from 1 to about 3 carbon atoms; R' is hydrogen or a hydrocarbyl group having from 1 to about 12, preferably from about 1 to about 6, most preferably from 1 to about 3, carbon atoms each X is independently hydrogen, a monovalent hydrocarbyl group having from 1 to about 12, preferably from about 1 to about 6, most preferably from about 1 to about 3 carbon atoms, or a halogen, preferably chlorine or bromine; n has a value of zero or 1 and n' has an average value from 1 to about 12, preferably from about 1 to about 6; and n" has a value from about 1 to about 12, preferably from about 1 to about 6.

The term hydrocarbyl as employed herein means any aliphatic, cycloaliphatic, aromatic, aryl substituted aliphatic or aliphatic substituted aromatic groups.

Particularly suitable aromatic epoxy-containing materials include, for example, the diglycidyl ethers of biphenol, resorcinol, catechol, hydroquinone, bisphenol A, bisphenol F, bisphenol K, bisphenol S,, mixtures thereof and the like. Also suitable are the triglycidyl thers of trisphenols prepared by reacting hydroxybenzaldehyde, vanillin, salicylaldehyde, methyl substituted hydroxybenzaldehyde, dimethyl substituted hydroxybenzaldehyde, or mixtures thereof and the like with phenol, cresol, dimethyl phenol, diethyl phenol, methyl ethyl phenol, bromophenol, chlorophenol, methyl bromophenol, methyl chlorophenol or mixtures thereof and the like.

Also suitable as the aromatic epoxy-contining material are the glycidyl ethers of novolac resins prepared by reacting an aldehyde such as, for example, formaldehyde, acetaldehyde, propionaldehyde, glyoxal or mixtures thereof and the like with a phenolic material such as, for example, phenol, bromophenol, chlorophenol, cresol, dimethyl phenol, diethyl phenol, methyl ethyl phenol or mixtures thereof and the like.

Suitable aliphatic epoxy-containing materials include those glycidyl ethers of glycols, polyoxyalkylene glycols or mixtures thereof and the like.

Also suitable are the glycidyl ethers of the hydrocarbon novolac resins, i.e. resins prepared by reacting dicyclopentadiene or an oligomer thereof with a phenolic material such as phenol, cresol, bromophenol, chlorophenol, dimethyl phenol, diethyl phenol, methyl ethyl phenol or mixtures thereof and the like.

Suitable phenolic hydroxyl-containing materials include, for example, those represented by the following formulas VI—X:

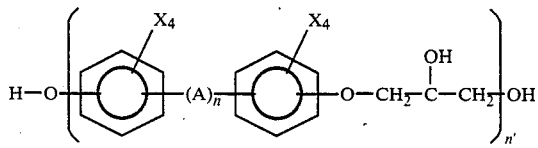

VI.

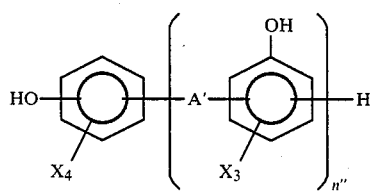

VII.

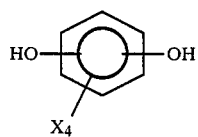

VIII.

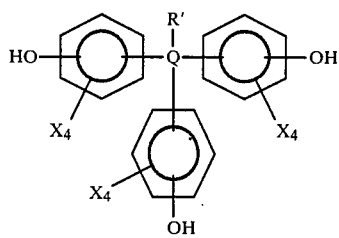

IX.

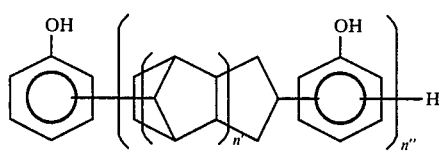

X.

wherein each A, A', Q, R, R', X, n, n' and n" are as defined above.

These materials having low total aliphatic halide contents are particularly useful in electronic applications such as in the preparation of electrical laminates, composites, potting compositions, molding compositions, coating compositions, and the like. They are particularly useful in the electronics industry.

The following examples are illustrative of the invention but are not to be construed as to limiting their scope in any manner.

EXAMPLE 1

1100 g (3.33 equiv.) of the diglycidyl ether of tetrabromobisphenol A with the bromine atoms ortho to the oxygen atoms, containing 631 ppm (parts per million by weight) hydrolyzable chloride and 1262 ppm total aliphatic chloride; and having an epoxide equivalent weight (EEW) of 330 was dissolved in 1100 g of methyl isobutyl ketone in a 5 liter flask equipped with temperature control and indicating means, reflux condenser and a mechanical stirrer. 148.5 g (0.55 equiv., 13.5% by weight based on the epoxy resin) of tetrabromobisphenol A with the bromine atoms ortho to the hydroxyl groups and 3.3 g (0.3% by weight based on the epoxy resin) of polyethylene glycol having an average molecular weight of 400 was added to the epoxy resin solution and the resultant solution was heated to 110° C. with stirring. 7.3 g (1.5 equiv. per equiv. of total aliphatic chloride) of 45% aqueous potassium hydroxide was added all at once and the reaction mixture was maintained at 110° C. with good agitation. Samples were taken hourly (every 3600 s) to determine the UV absorption of the phenolic hydroxyl group of the tetrabromobisphenol A. As the reaction proceeded, the UV absorption declined from 5, 1.95, 0.62, 0.53 and stabilized at about 0.5 after reacting for three hours (10,800 s) which indicated that substantially all of the hydroxyl groups had reacted. The reaction mixture was then diluted to 20% solids concentration with methyl isobutyl ketone, neutralized with carbon dioxide and then washed with deionized water several times to remove the residual potassium chloride. The organic phase from the water washes was placed on a rotary evaporator under a full vacuum at 160° C. to remove the solvent. A solid, white resin having a Mettler softening point of 81.7° C., an EEW of 450, 17 ppm hydrolyzable chloride and 410 ppm total aliphatic chloride was obtained.

COMPARATIVE EXPERIMENT A 200 g (0.606 epoxy equiv.) of a diglycidyl ether of tetrabromobisphenol A with the bromine atoms ortho to the oxygen atoms and containing 631 ppm of hydrolyzable chloride and 1262 ppm of total aliphatic chloride and 28 g (0.103 equiv., 14% based on the weight of the epoxy resin) of tetrabromobisphenol A with the bromine atoms ortho to the hydroxyl group were placed in a 500 ml flask equipped with a stirrer, thermowell and reflux condenser. The mixture was heated to 110° C. with stirring and then 1.8 g of ethyl triphenyl phosphonium acetate.acetic acid catalyst was added all at once. The temperature of the rection mixture was allowed to rise to 150° C. and the reaction mixture was maintained thereat for 2 hours (7,200 s). The reaction mixture was then poured onto an aluminum sheet and the product analyzed. White solids with a Mettler softening point of 83.5° C., an EEW of 462, a hydrolyzable chloride content of 755 ppm and a total aliphatic chloride content of 1268 ppm was obtained.

EXAMPLE 2

75 g (0.397 equiv.) of the diglycidyl ether of bisphenol A having and EEW of 189 and containing 220 ppm of hydrolyzable chloride and 2170 ppm of total aliphatic chloride was dissolved in 75 g of methyl isobutyl ketone in a 500 ml flask equipped with temperature control and indicating means, reflux condenser and mechanical stirrer. 22.6 g (0.198 equiv., 30% by weight based on the epoxy resin) of bisphenol A and 0.375 g (0.5% by weight based on the epoxy resin) of polyethylene glycol having an average molecular weight of 400 were added to the epoxy resin solution and the resultant solution was heated to 110° C. with stirring. 0.11 g (0.3 equiv. per equiv. of total aliphatic chloride) of 50% aqueous sodium hydroxide was added all at once and the reaction mixture was maintained at 110° C. UV absorption readings declined from 2 to 0.19 and stabilized thereat after 2 hours (7,200 s). The reaction mixture was diluted to 20% solids concentration with methyl isobutyl ketone, neutralized with dilute phosphoric acid and washed with deionized water several times to remove the residual sodium chloride. The organic phase from the water washes was placed on a rotary evaporator under a full vacuum at 170° C. to remove the solvent. A white, solid resin having a Mettler softening point of 83.8° C., an EEW of 513, containing 37 ppm of hydrolyzable chloride and 1480 ppm of total aliphatic chloride was obtained.

COMPARATIVE EXPERIMENT B 75 g (0.397 epoxy equiv.) of a diglycidyl ether of bisphenol A having an EEW of 189 which contained 220 ppm of hydrolyzable chloride and 2170 ppm of total aliphatic chloride and 22.6 g (0.198 hydroxyl equiv.) of bisphenol A were heated to 110° C. in apparatus similar to comparative experiment A. 0.675 g of ethyl triphenyl phosphonium acetate.acetic acid catalyst was added all at once. The temperature of the reaction mixture was allowed to rise to 150° C. and then maintained thereat for 2 hours (7,200 s). The reaction mixture was then poured onto an aluminum sheet and the product analyzed. A white, solid resin having a Mettler softening point of 84° C., an EEW of 520, a hydrolyzable chloride content of 216 ppm and a total aliphatic chloride content of 2161 ppm was obtained.

EXAMPLE 3

75 g (0.397 equiv.) of the diglycidyl ether of bisphenol A having and EEW of 189 which contained 220 ppm of hydrolyzable chloride and 2170 ppm of total aliphatic chloride was dissolved in 75 g of methyl isobutyl ketone in a 500 ml flask equipped with temperature control and indicating means, reflux condenser and mechanical stirrer. 30 g (0.263 equiv., 40% by weight based on the epoxy resin) of bisphenol A and 0.375 g (0.5% by weight based on the epoxy resin) of polyethylene glycol having a molecular weight of 400 were added to the epoxy resin solution and the resultant solution was heated to 110° C. with stirring. 0.11 g (0.3 equiv. per equiv. of total aliphatic chloride) of 50% aqueous sodium hydroxide was added all at once and the reaction mixture was maintained at 110° C. UV absorption readings declined from 3.54 to 0.19 and stabilized thereat after 6 hours (21,600 s). The reaction mixture was diluted to 20% solids concentration with methyl isobutyl ketone, neutralized with dilute phosphoric acid and washed with deionized water several times to remove the residual sodium chloride. The organic phase from the water washes was placed on a rotary evaporator under a full vacuum at 170° C. to remove the solvent. A white, solid resin having a Mettler softening point of 97° C., an EEW of 956, containing 14 ppm of hydrolyzable chloride and 1510 ppm of total aliphatic chloride was obtained.

EXAMPLE 4

500 g (2.5 equiv.) a cresol/formaldehyde epoxy novolac resin having and EEW of 200, an average epoxide functionality of 6, a kinematic viscosity of 800 centistokes ($800 \times 10^{-6}$ m$^2$/s) at 150° C and containing 850 ppm of hydrolyzable chloride and 2826 ppm of total aliphatic chloride was dissolved in 500 g of a 75/25 percent by weight mixture of methyl ethyl ketone and toluene in a 2 liter flask equipped with thermowell, reflux condenser and stirrer. 4.2 g (0.0368 equiv., 1.2% by weight based on the epoxy resin) of bisphenol A and 2.5 g (0.5% by weight based on the epoxy resin) of polyethylene glycol having an average molecular weight of 400 were added to the epoxy resin solution and the resultant solution was heated to 80° C. with stirring. 6.44 g (1.3 equiv. per equivalent of total aliphatic chloride contained in the epoxy resin) of 45% aqueous potassium hydroxide was added all at once and the reaction mixture was maintained at 80° C. UV absorption readings declined from 2.25 to 0.33 and stabilized thereat after 2.5 hours (9000 s). The reaction mixture was diluted to 20% solids concentration with methyl ethyl ketone/toluene solvent mixture, neutralized with carbon dioxide and washed with deionized water several times to remove the residual potassium chloride. The organic phase from the water washes was placed on a rotary evaporator under a full vacuum at 170° C. to remove the solvent. A yellow, solid resin having a Mettler softening point of 89.9° C., an EEW of 219, a viscosity of 1491 centistokes ($1491 \times 10^{-6}$ m$^2$/s) at 150° C. containing 17 ppm of hydrolyzable chloride and 635 ppm of total aliphatic chloride was obtained.

We claim:

1. A process for preparing advanced epoxy resins having a low total aliphatic halide content which process comprises subjecting a mixture consisting essentially of (1) a material containing an average of more than one 1,2-epoxy group per molecule and which contains aliphatic halide moieties;

(2) a material containing an average of more than one aromatic hydroxyl group per molecule;

(3) at least one inert liquid diluent or solvent for components (1) and (2) which do not contain an aliphatic hydroxyl-containing material;

(4) at least one material containing at least one aliphatic hydroxyl group per molecule which is free of epoxide groups; and (5) at least one alkali metal hydroxide to conditions suitable for reacting the aromatic hydroxyl groups of component (2) with the epoxy groups of component (1) and wherein (i) component (4) is present in an amount of from about 0.1 to about 5 percent by weight of the amount of component (1);

(ii) component (5) is present in an amount of from about 0.25 to about 10 moles per equivalent of total aliphatic halide contained in component (1); and (iii) components (1) and (2) are employed in an amount which provides a phenolic hydroxyl group to epoxy group ratio of from 0.01:1 to about 2:1;

thereby producing an advanced product having a total aliphatic halide content lower than that contained in component (1).

2. A process of claim 1 wherein component (4) is present in an amount of from about 0.2 to about 1 percent by weight of component (1), component (5) is present in an amount of from about 1 to about 3 moles per equivalent of total aliphatic halide contained in component (1) and components (1) and (2) are present in quantities which provide a ratio of hydroxyl groups to epoxy groups of from about 0.01:1 to about 1.1:1 and the reaction is conducted at a temperature of from about 50° C. to about 120° C.

3. A process of claim 2 wherein components (1) and (2) are present in quantities which provide a ratio of hydroxyl groups to epoxy groups of from about 0.1:1 to about 0.7:1 and the reaction is conducted at a temperature of from about 80° C. to about 120° C.

4. A process of claim 1 wherein component (1) is a diglycidyl ether of a dihydric phenol, an epoxy novolac resin or a combination thereof; component (2) is a dihydric phenol; component (3) is an aromatic compound, a ketone or a combination thereof and component (4) is a material which contains two aliphatic hydroxyl groups per molecule.

5. A process of claim 4 wherein component (1) is a diglycidyl ether of bisphenol A, a halogenated bisphenol A or an epoxy novolac resin; component (2) is bisphenol A or a halogenated bisphenol A; component (3) is toluene, methyl isobutyl ketone, methyl ethyl ketone or a combination thereof; component (4) is a polyethylene glycol having an average molecular weight of from about 100 to about 1000; and component (5) is potassium hydroxide, sodium hydroxide or a combination thereof.

6. A process of claim 2 wherein component (1) is a diglycidyl ether of a dihydric phenol, an epoxy novolac resin or a combination thereof; component (2) is a dihydric phenol; component (3) is an aromatic compound, a ketone or a combination thereof and component (4) is a material which contains two aliphatic hydroxyl groups per molecule.

7. A process of claim 6 wherein component (1) is a diglycidyl ether of bisphenol A, a halogenated bisphenol A or an epoxy novolac resin; component (2) is bisphenol A or a halogenated bisphenol A; component (3) is toluene, methyl isobutyl ketone, methyl ethyl ketone or a combination thereof; component (4) is a polyethylene glycol and component (5) is potassium hydroxide, sodium hydroxide or a combination thereof.

8. A process of claim 3 wherein component (1) is a diglycidyl ether of a dihydric phenol, an epoxy novolac resin or a combination thereof; component (2) is a dihydric phenol; component (3) is an aromatic compound, a ketone or a combination thereof and component (4) is a material which contains two aliphatic hydroxyl groups per molecule.

9. A process of claim 8 wherein component (1) is a diglycidyl ether of bisphenol A, a halogenated bisphenol A or an epoxy novolac resin; component (2) is bisphenol A or a halogenated bisphenol A; component (3) is toluene, methyl isobutyl ketone, methyl ethyl ketone or a combination thereof; component (4) is a polyethylene glycol having an average molecular weight of from about 100 to about 1000; and component (5) is potassium hydroxide, sodium hydroxide or a combination thereof.

* * * * *